United States Patent
Stewart et al.

(10) Patent No.: US 11,163,564 B1
(45) Date of Patent: Nov. 2, 2021

(54) VECTOR COMPARE AND STORE INSTRUCTION THAT STORES INDEX VALUES TO MEMORY

(71) Applicants: VeriSilicon Microelectronics (Shanghai) Co., Ltd., Shanghai (CN); VeriSilicon Holdings Co., Ltd., Grand Cayman (KY)

(72) Inventors: Charles H. Stewart, Richardson, TX (US); Charles R. Bezet, Rowlett, TX (US)

(73) Assignees: VeriSilicon Microelectronics (Shanghai) Co., Ltd., Shanghai (CN); VeriSilicon Holdings Co., Ltd., Grand Cayman (KY)

( * ) Notice: Subject to any disclaimer, the term of this patent is extended or adjusted under 35 U.S.C. 154(b) by 243 days.

(21) Appl. No.: 16/154,404

(22) Filed: Oct. 8, 2018

(51) Int. Cl.
*G06F 9/30* (2018.01)
*G06F 9/38* (2018.01)
*G06F 15/80* (2006.01)

(52) U.S. Cl.
CPC ...... *G06F 9/30036* (2013.01); *G06F 9/30021* (2013.01); *G06F 9/30141* (2013.01); *G06F 9/3887* (2013.01); *G06F 15/8061* (2013.01); *G06F 15/8092* (2013.01)

(58) Field of Classification Search
CPC .................................................. G06F 9/30036
See application file for complete search history.

(56) References Cited

U.S. PATENT DOCUMENTS

| | | | | |
|---|---|---|---|---|
| 2008/0288754 A1* | 11/2008 | Gonion | ............... | G06F 9/30072 712/217 |
| 2012/0166761 A1* | 6/2012 | Hughes | ............... | G06F 9/30036 712/7 |
| 2014/0181466 A1* | 6/2014 | Forsyth | ............... | G06F 9/30021 712/7 |
| 2015/0277912 A1* | 10/2015 | Gueron | ..................... | G06F 7/24 712/212 |
| 2019/0205137 A1* | 7/2019 | Meadows | ............... | G06F 9/355 |

OTHER PUBLICATIONS

Duda, et al.; "Hough transform"; Wikipedia; https://en.wikipedia.org/wiki/Hough_transform; 1972; 1 pg.
Canny; "Canny edge detector"; Wikipedia; https://en.wikipedia.org/wiki/Canny_edge_detector; 1986; 1 pg.
(Continued)

*Primary Examiner* — Jacob Petranek

(57) ABSTRACT

The present disclosure is directed to methods to generate a packed result array using parallel vector processing, of an input array and a comparison operation. In one aspect, an additive scan operation can be used to generate memory offsets for each successful comparison operation of the input array and to generate a count of the number of data elements satisfying the comparison operation. In another aspect, the input array can be segmented to allow more efficient processing using the vector registers. In another aspect, a vector processing system is disclosed that is operable to receive a data array, a comparison operation, and threshold criteria, and output a packed array, at a specified memory address, comprising of the data elements satisfying the comparison operation.

20 Claims, 4 Drawing Sheets

(56) References Cited

OTHER PUBLICATIONS

"Scalar processor"; Wikipedia; https://en.wikipedia.org/wiki/Scalar_processor; 2005; 1 pg.
"Vector processor"; Wikipedia; https://en.wikipedia.org/wiki/Vector_processor; 2003; 1 pg.
"tf.scan"; https://www.tensorflow.org/api_docs/python/tf/scan; 2017; 3 pgs.
"Prefix sum"; Wikipedia; https://en.wikipedia.org/wiki/Prefix_sum; 2012; 1 pg.

* cited by examiner

VECTOR COMPARE AND STORE INSTRUCTION THAT STORES INDEX VALUES TO MEMORY

TECHNICAL FIELD

This application is directed, in general, to vector based operations and, more specifically, to storing value comparison indices in memory.

BACKGROUND

In processing, there can be a need to compare values to a threshold and then output the values that satisfy the threshold requirements. When this process uses a scalar processor, the computing cycles necessary to complete the comparison operation and output the results are directly proportional to the number of values that need to be checked. In vector processors, the computing can be done in parallel, and the results will be a compilation of the negative and positive results. An improved method is needed to provide a parallel processing computing cycle advantage while also outputting a packed result set.

SUMMARY

One aspect provides for a method to store a comparison result using a single instruction multiple data (SIMD) processor. In one embodiment, the method includes: (1) computing, in parallel, an index vector indicating a result of a comparison operation on a received data vector, (2) generating, in parallel, a set of memory offsets utilizing a scan operation on the index vector, and (3) storing, in parallel, a packed set of the comparison results from the index vector, utilizing the set of memory offsets.

Another aspect provides for a computer program product having a series of operating instructions stored on a non-transitory computer-readable medium that directs a data processing apparatus when executed thereby to perform operations utilizing a single instruction multiple data (SIMD) processor. In one embodiment, the computer program product includes: (1) computing, in parallel, an index vector indicating a result of a comparison operation on a received data vector, (2) generating, in parallel, a set of memory offsets utilizing a scan operation on the index vector, and (3) storing, in parallel, a packed set of the comparison results from the index vector, utilizing the set of memory offsets.

Another aspect provides for a vector comparison storing system utilizing a single instruction multiple data (SIMD) processor. In one embodiment, the system includes: (1) a set of vector registers wherein the set includes one or more vector registers, operable to store a data array and a comparison operation result, and (2) an instruction engine, communicatively coupled to the set of vector registers, and operable to execute a comparison operation using the set of vector registers, wherein each vector register uses parallel processing, to generate the comparison operation result, wherein the execute further comprises computing an index vector, and generating memory offsets using a scan operation.

BRIEF DESCRIPTION

Reference is now made to the following descriptions taken in conjunction with the accompanying drawings, in which.

DETAILED DESCRIPTION

Figure 1:
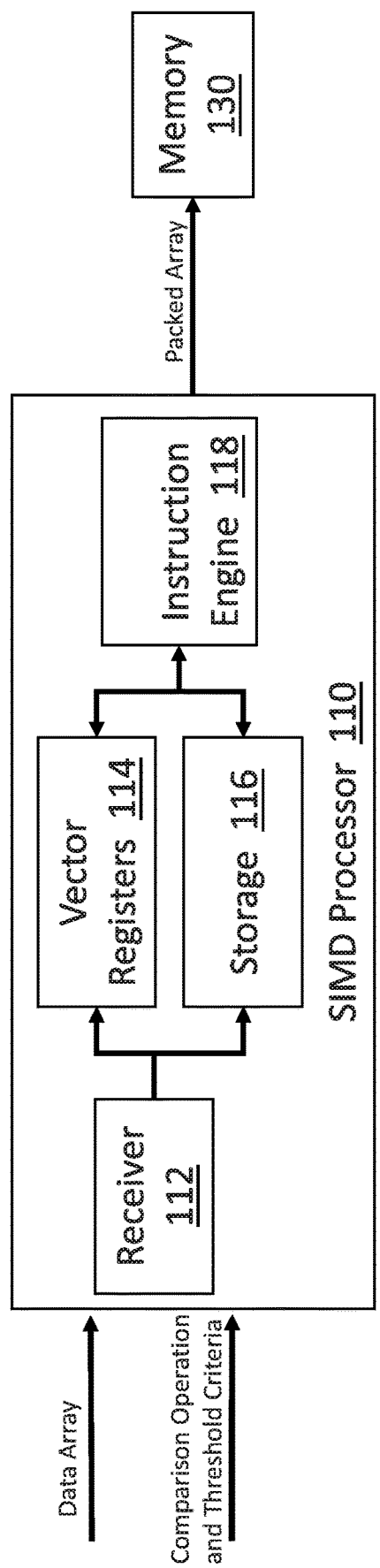
FIG. 1 is an illustration of a block diagram of an example vector processing system to output a packed result array.

In computing systems, certain operations may need to be executed quickly and efficiently so as to not introduce an unnecessary delay in the execution of an application running on the computing system. One such operation can be to compare a series, i.e., an array, of data values to threshold criteria, and then store the indices of the data values that satisfy the comparison operation. The stored indices are the comparison operation result. For example, the data values can be pixel data (coordinates and color), such as when an edge detection process of an image is executed.

An example of such an operation is demonstrated in Listing 1. Listing 1 performs a simple comparison operation on each element of an array and stores those element indices of the array that satisfy the comparison operation, i.e., the set of comparison operation results.

Listing 1: Example pseudo code for performing a comparison and store operation on an array

```
for (x=0; x<norm_addr.dim_x; x++)
{
    vx_int8*norm_ptr=norm_base+x;
    if (*norm_ptr>threshold)
    {
        *stack_top=x;
        ++stack_top;
    } // end if condition
} // end for loop
```

The function in Listing 1 can be stated that for the values in a data array $(a_1, a_2, \ldots, a_n)$, the indices $(0, 1, \ldots, n)$ of the data array satisfying the comparison operation are stored. The indices can be utilized by other processes or systems. The comparison operation can be referenced as the function of the data element $a_i$, where i is an index to the data array, i.e., $f(a_i)$. As an example demonstration of an execution of Listing 1, consider a data array containing the values [3, 14, −2, −1, 7, −5, 6, 4]. As input, the function $f(\ )$ is 'greater than' and the threshold criteria is 5, i.e., $f(a_i)=a_i>5$. The output array, holding the indices of the values satisfying the threshold criteria can be represented by the indices [1, 4, 6].

The described operation can be executed and resolved using different algorithms. For example, when a scalar processor is being utilized, or other type of single instruction single data processor (SISD), the performance of the process execution can be represented by Big-O notation O(n), where n is the number of elements in the data array. As the length of the data array increases, the compute time to process the data array through the function $f(\ )$, also increases. For example, for each element in the data array the following steps would need to be executed (1) compute the next pointer address, (2) evaluate $f(\ )$, and (3) if the threshold criteria is satisfied, push the pointer to the output.

Another algorithm that can be utilized is vector processing. Vector processors can use a single instruction to operate on multiple data (SIMD). The three steps described above, compute/evaluate/push, can be executed using parallel pipeline processing. The performance can be more efficient than when using a scalar processor. The performance can be represented by O(1), meaning that the number of data elements in the data array, as long as the vector register is large enough to hold the data array, does not affect the compute time to evaluate the data array. A detriment of using this type of algorithm can be that vector processors can produce a resulting array of the same length as the data array. The indices of the data elements that satisfy the $f(\ )$ are stored along with indicators for the data elements that did not satisfy $f(\ )$. This resulting array is not packed as it contains information not wanted in the result array. For example, using the same demonstration execution as shown above for Listing 1, the resulting index array can be represented by [0, 1, 0, 0, 4, 0, 6, 0]. The resulting array output should be a packed array, for example, [1, 4, 6]. Additional operations would be needed to generate the desired output format, at a cost of additional compute cycles.

This disclosure describes a technique to process the data array in a vector processor to generate a packed result data set while maintaining a minimum number of compute cycles to complete the operation, i.e., maintaining O(1). The technique can take in the same data array as described above, compute a match array, such as evaluating $f(\ )$, and then using a scan operation to generate a memory offset where the index values can be stored.

For example, using a received data array [3, 14, −2, −1, 7, −5, 6, 4], the comparison operation $f(\ )$ can be applied to the data array, to generate the comparison operation results. The threshold criteria used in the comparison operation $f(\ )$ can also be received by the process or retrieved from a data location. For example, an application executing this process can provide the threshold criteria along with the data array, the threshold criteria can be retrieved from a data location, such as a register or memory location, and the threshold criteria can be determined by other factors, such as calculated using other retrieved data elements. The $f(\ )$ can generate an index array, that can be represented by [0, 1, 0, 0, 4, 0, 6, 0]. The indices of the data array that satisfy $f(\ )$ are stored in the index array, i.e., the comparison operation results.

A match array can be computed, represented as an array, such as [0, 1, 0, 0, 1, 0, 0]. A one indicates that the $f(\ )$ is satisfied, i.e., true, and a zero indicates that the $f(\ )$ is not satisfied, i.e., false. Next, using an additive scan technique, a prefix sum function $P(f(\ ))$, can be applied to the match array generating a scan array, such as [0, 0, 1, 1, 1, 2, 2, 3]. Other scan techniques can be used as well. An advantage of the additive scan technique is that the last element of the scan array indicates the number of data elements of the data array that satisfied the $f(\ )$, i.e., the total number of indices to be output. That number can be used by other processes, such as to identify the end of the memory offsets where the resulting data has been stored.

The next step of the technique is the execution of a scatter type operation to place the index value stored in the index array in a memory location using the corresponding offset in the scan array. In a SIMD, the scatter process can save a series of result data in parallel, where the series of data is limited by the number of available store ports on the SIMD. An example pseudo code of a scatter operation is presented in Listing 2.

Listing 2: Example pseudo code for a scatter process
// data is a vector of data elements
// addr is a vector of addresses to memory
for (i=0; i<N; ++i) memory [addr[i]]=data[i]

In this example, the index value 1 can be stored at a memory location at a zero offset, the index value 4 can be stored at the same base memory location with an offset of one, and the index value 6 can be stored at the same base memory location with an offset of two. The memory offsets shown in these examples use a data size of one. In alternative aspects, the data size can vary and therefore the offsets are multiplied by the data size. This can result in a memory address of the base memory address plus the memory offset multiplied by the size of the data elements to be stored, e.g., memoryAddr=baseMemoryAddr+ (memoryOffset*indexSize). The resulting memory locations can represent a packed array of index results, where each index references the original data array. The example used herein to demonstrate the technique is presented in Chart 1.

CHART 1

An example execution of the vector packed response algorithm

| Data Structure | Value |
| --- | --- |
| Received data array | [3, 14, −2, −1, 7, −5, 6, 4] |
| Determining match array | [0, 1, 0, 0, 1, 0, 1, 0] |
| Computed index array | [0, 1, 0, 0, 4, 0, 6, 0] |
| Generating scan array | [0, 0, 1, 1, 1, 2, 2, 3] |
| Value at base memory location | 1 |
| Value at base memory location + 1 | 4 |
| Value at base memory location + 2 | 6 |
| Additive scan count | 3 |

Each of the arrays described in the algorithm can be processed in the processor using one or more vector registers, thereby taking advantage of the parallel pipeline processing capabilities of the vector processor. In an alternative aspect, each of the steps described herein can be segmented. For example, if the data array is larger than the size of the available vector registers, the data array can be segmented, using a segmentation scheme, so that each segment is the size of, or smaller than, the vector register. The algorithm can be iteratively executed on each segment. Another advantage of the additive scan can be that the scan array count, and therefore the memory offset value, can be carried over from one segment to another segment without having to recalculate the scan array count.

In another aspect, the store process can be segmented. When there are fewer available store ports in the processor than the scatter operation needs to store the output index vector, then the store process can segment, using its own segmentation scheme, the output index vector to the size of, or smaller than, the number of store ports. The scatter operation can then process each segment in turn. Segmenting any of the described processes will increase the amount of computing cycles required to complete that process, as represented by O(s), where s is the number of segments being processed.

Turning now to the figures, FIG. 1 is an illustration of a block diagram of an example vector processing system 100 configured to output a packed result array. Vector processing system 100 can receive a data array, perform a designated function on the array, and output a result array to a memory location. Vector processing system 100 includes a SIMD processor 110 and a memory 130. SIMD processor 110 includes a receiver 112, vector registers 114, storage 116, and an instruction engine 118. SIMD processor can include additional elements. SIMD processor 110 can combine elements, for example, storage 116 can be part of vector registers 114, and receiver 112 and instruction engine can be combined. The elements included in SIMD processor 110 can also be split into one or more components, and be included across one or more SIMD processors that are communicatively coupled.

Receiver 112 is capable of receiving an array of data elements and storing them in one or more vector registers 114. In alternative aspects, receiver 112 is also capable of receiving comparison operations, threshold criteria, and a base memory address. For example, comparison operations can be greater than, less than, equal to, and other operation types. Threshold criteria can be specified by the providing data, such as providing a number or formula, to use in the comparison operation. The comparison operation and the threshold criteria, if either are provided, can be stored in storage 116. In alternative aspects, a pointer to a comparison operation, a pointer to a threshold criteria, and a pointer to a base memory address, can be received and stored, where the respective pointers point to a memory location outside of SIMD processor 110.

Instruction engine 118 can execute the disclosed methods using the vector registers 114 and the storage 116. SIMD processor 110 can output a result array, such as a packed array to the memory 130, starting at the previously identified base memory address. The result array can be indices into the received data array of those elements that satisfy the comparison operation. The SIMD processor 110 describes a functional organization of the steps used in the method. The steps can be implemented in a physical SIMD processor in various ways, and can be implemented across one or more SIMD processors.

Figure 2:
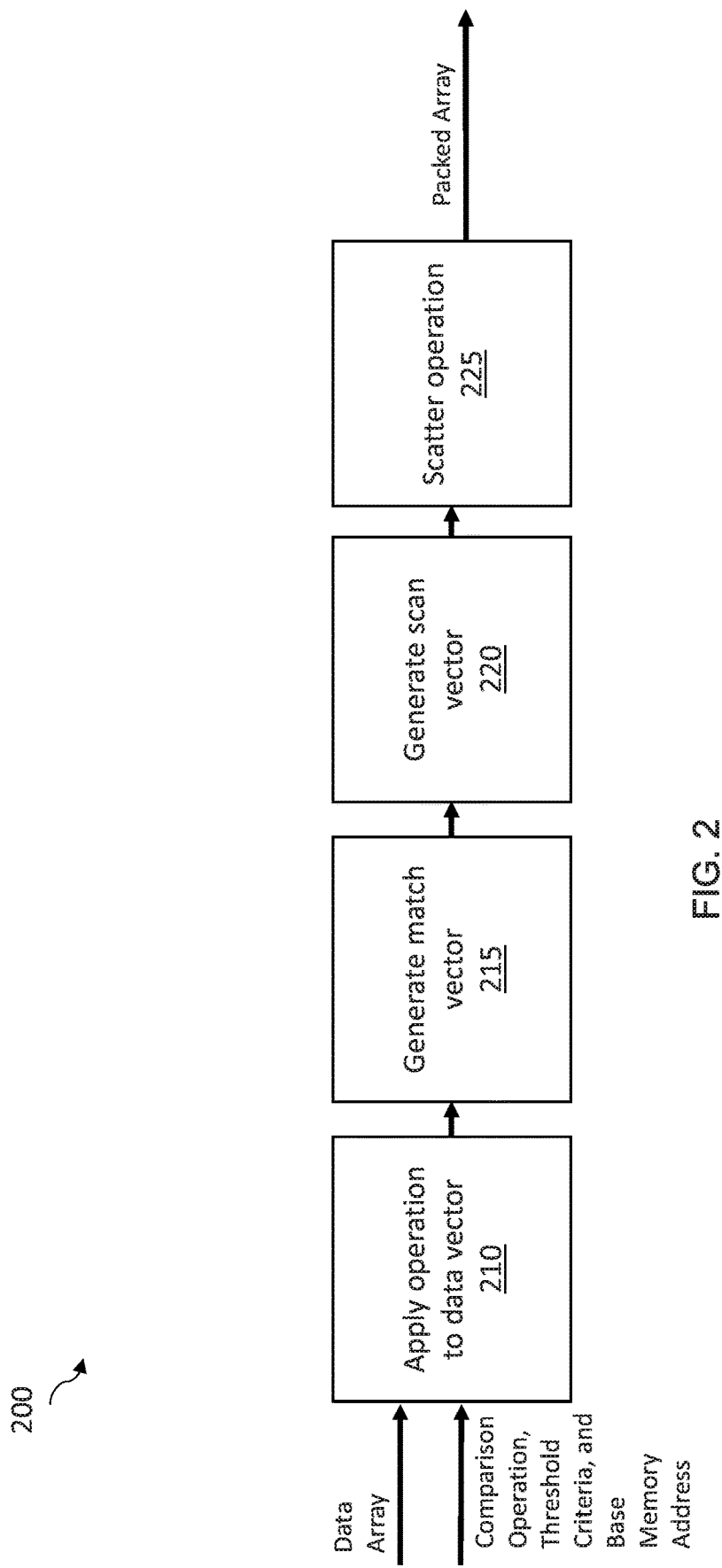
FIG. 2 is an illustration of a block diagram of an example process for a vector operation flow to output a packed result array.

FIG. 2 is an illustration of a block diagram of an example process for a vector operation flow 200 to output a packed result array. Vector operation flow 200 is a logical view of the methods described herein. One or more data arrays can be received by the vector operation flow 200. A comparison operation can be received by the vector operation flow 200. The comparison operation can be of various types of computing operations. Vector operation flow 200 can also receive threshold criteria that can be used with the comparison operation. For example, an execution of the process can use a comparison operation of 'greater than', and for different data arrays, different threshold criteria can be utilized with the same comparison operation. In other aspects, vector operation flow 200 can also receive a base memory address to where an output can be stored.

In flow 210, the comparison operation is applied to the stored data array vector(s) to generate an index vector(s) with the comparison operation results. Flow 215 generates a match vector(s) indicating which indices satisfy the comparison operation. Flow 220 generates a scan vector(s) indicating the relative offset for each index that satisfies the comparison operation. Flow 225 implements a scatter operation to store the indices, in consecutive memory address locations, of those indices that satisfy the comparison operation. The consecutive memory address locations can be blocks of memory locations, where the block size is dependent on the size of the data elements, i.e., indices, being stored. The result is a packed array of indices into the original data array for those elements that satisfy the comparison operation.

Figure 3:
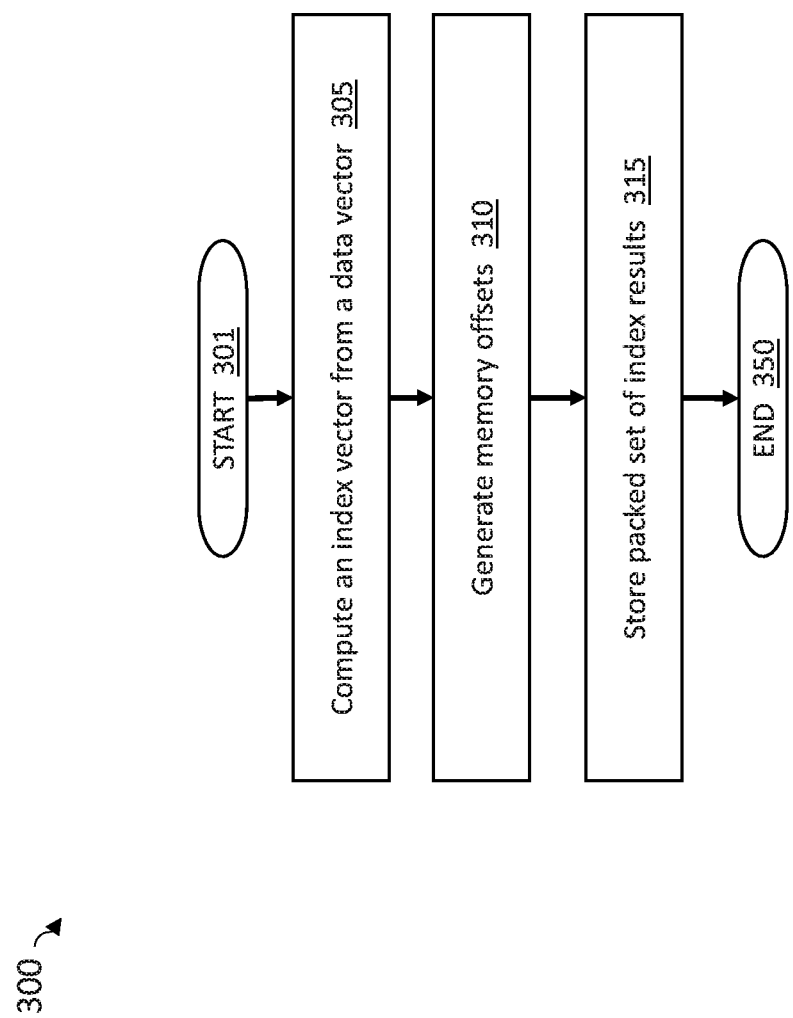
FIG. 3 is an illustration of a flow diagram of an example method to use a vector operation to generate and store a packed result array.

FIG. 3 is an illustration of a flow diagram of an example method 300 to use a vector operation to generate and store a packed result array. The method 300 begins at a step 301 and proceeds to a step 305. In a step 305 an index vector is computed from a data vector using a provided comparison operation and threshold criteria. Proceeding to a step 310, memory offsets can be generated based on the quantity of data elements in the data array that satisfy the comparison operation. Proceeding to a step 315, the resulting set of indices, i.e., comparison operation results, can be stored in consecutive blocks of memory locations, effectively creating a packed array of result indices. The method 300 ends at a step 350.

Figure 4:
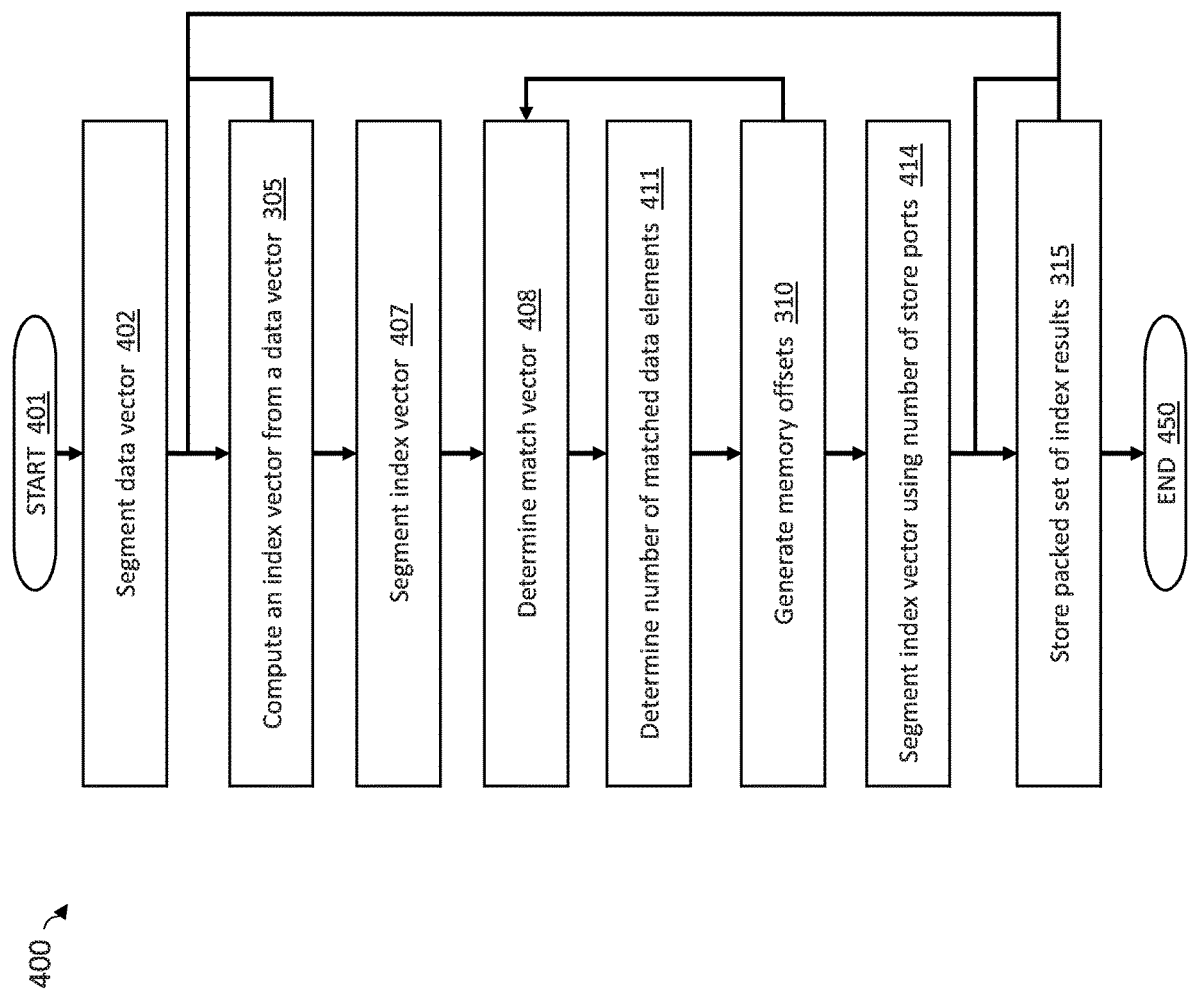
FIG. 4 is an illustration of a flow diagram of an example method, building on FIG. 3, where the process can segment portions of the flow.

FIG. 4 is an illustration of a flow diagram of an example method 400, building on FIG. 3, where the process can segment portions of the flow, using various segmentation schemes. Method 400 begins at a step 401 and proceeds to a step 402. In the step 402, the received data array can be segmented to fit into the size constraints of the vector registers. Proceeding to the former step 305, indices can be generated for one segment. From step 305, the method 400 returns to step 305 for the next segment until all of the segments have been processed.

After all step 305 segments have been processed, the method 400 continues to a step 407. In the step 407, the index vector can be segmented. Proceeding to a step 408, a match vector can be determined for the segmented index vector. Proceeding to a step 411, the number of matched data elements can be determined, such as through an additive scan process. Proceeding to the former step 310, memory offsets can be generated for the match vector.

Method 400 can then proceed back to step 408 and process another segment of data. Once all of the segments have been processed, the method 400 can proceed to a step 414. In a step 414, the result vector can be segmented, for example, using the number of store ports available on the processor.

Proceeding to the former step 315, the segmented result vector can be output to memory. From step 315, the method 400 can return to step 315 until all segments have been processed.

Alternatively, the segmentation can occur in the step 402 as described above, and each segment is processed through one or more of the subsequent steps, for example, through to step 315. At the last step, such as step 315 in this example, the method 400 can loop back to step 305 and process the next segment through the steps. Once the segments have been processed, the method 400 ends at a step 450.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method to store a comparison result using a single instruction multiple data (SIMD) processor, comprising:
   computing, in parallel, an index vector indicating a result of a comparison operation on a received data vector, wherein said comparison operation compares each data element of said data vector to a threshold criteria;
   generating, in parallel, a set of memory offsets utilizing a scan operation on said index vector, wherein said index vector includes indices of said data vector that satisfy said comparison operation; and
   storing, in parallel and utilizing said set of memory offsets, a packed set of said indices from said index vector that satisfy said comparison operation.

2. The method as recited in claim 1, wherein said computing includes determining a match vector, wherein said match vector indicates a corresponding value in said index vector satisfying said comparison operation.

3. The method as recited in claim 1, wherein said storing utilizes one or more store ports to store data elements from said data vector.

4. The method as recited in claim 1, wherein said scan operation is an additive scan operation and a last element of said scan operation represents a number of data elements of said data vector satisfying said comparison operation.

5. The method as recited in claim 1, wherein said computing utilizes a segmentation scheme and iteratively computes each segment.

6. The method as recited in claim 1, wherein said generating utilizes a segmentation scheme and iteratively generates each segment.

7. The method as recited in claim 1, wherein said storing utilizes a segmentation scheme and iteratively stores each segment.

8. A computer program product having a series of operating instructions stored on a non-transitory computer-readable medium that directs a data processing apparatus when executed thereby to perform operations utilizing a single instruction multiple data (SIMD) processor, said operations comprising:
   computing, in parallel, an index vector indicating a result of a comparison operation on a received data vector, wherein said comparison operation compares each data element of said data vector to a threshold criteria;
   generating, in parallel, a set of memory offsets utilizing a scan operation on said index vector, wherein said index vector includes indices of said data vector that satisfy said comparison operation; and
   storing, in parallel and utilizing said set of memory offsets, a packed set of said indices from said index vector that satisfy said comparison operation.

9. The computer program product as recited in claim 8, wherein said computing includes determining a match vector, wherein said match vector indicates a corresponding value in said index vector satisfying said comparison operation.

10. The computer program product as recited in claim 8, wherein said scan operation is an additive scan operation and a last element of said scan operation represents a number of data elements to be output.

11. The computer program product as recited in claim 8, wherein said computing utilizes a segmentation scheme and iteratively computes each segment.

12. The computer program product as recited in claim 8, wherein said generating utilizes a segmentation scheme and iteratively generates each segment.

13. The computer program product as recited in claim 8, wherein said storing utilizes a segmentation scheme and iteratively stores each segment.

14. A vector comparison storing system utilizing a single instruction multiple data (SIMD) processor, comprising:
   a set of vector registers, wherein said set of vector registers includes one or more vector registers, operable to store a data array and comparison operation results; and
   an instruction engine, communicatively coupled to said set of vector registers, and operable to execute a comparison operation using said set of vector registers that compares each data element of said data array to a threshold criteria, wherein each vector register uses parallel processing, to generate said comparison operation result, wherein said execute further comprises computing an index vector that includes indices of said data array that satisfy said comparison operation, and generating memory offsets using a scan operation, and said instruction engine is further operable to utilize said memory offsets to store said indices that satisfy said comparison operation in a packed set.

15. The vector comparison storing system as recited in claim 14, further comprising:
   a receiver, operable to receive said data array, said comparison operation, a threshold criteria, and a base memory address; and
   a storage, communicatively coupled to said receiver, vector registers, and instruction engine, and operable to store said data array, said comparison operation, said threshold criteria, and said base memory address.

16. The vector comparison storing system as recited in claim 15, wherein said instruction engine is operable to store said indices in said packed set utilizing a scatter operation, using said base memory address and said memory offsets.

17. The vector comparison storing system as recited in claim 14, wherein said scan operation is an additive scan operation and a last index of said scan operation is a total number of indices to be output.

18. The vector comparison storing system as recited in claim 14, wherein said instruction engine is operable to segment said data array and segment said comparison operation results, and perform said execute on each segment.

19. The method as recited in claim 1, wherein said computing includes employing, for said comparison operation, a same threshold criteria for each data element of said data vector.

20. The method as recited in claim 1, wherein said storing includes employing a scatter operation to place said indices from said index vector in said packed set utilizing said set of memory offsets.

\* \* \* \* \*